United States Patent
Mohr

(10) Patent No.: US 12,470,443 B2
(45) Date of Patent: Nov. 11, 2025

(54) PREDICTIVE BASELINE WANDER CORRECTION

(71) Applicant: Mellanox Technologies, Ltd., Yokneam (IL)

(72) Inventor: Johan Jacob Mohr, Copenhagen (DK)

(73) Assignee: Mellanox Technologies, Ltd., Yokneam (IL)

( * ) Notice: Subject to any disclaimer, the term of this patent is extended or adjusted under 35 U.S.C. 154(b) by 0 days.

(21) Appl. No.: 18/120,303

(22) Filed: Mar. 10, 2023

(65) Prior Publication Data
US 2024/0305508 A1 Sep. 12, 2024

(51) Int. Cl.
*H04L 25/06* (2006.01)

(52) U.S. Cl.
CPC ................... *H04L 25/061* (2013.01)

(58) Field of Classification Search
CPC ..................................... H04L 25/061
USPC ........................................... 375/317
See application file for complete search history.

(56) References Cited

U.S. PATENT DOCUMENTS

| | | | | |
|---|---|---|---|---|
| 3,681,522 A * | 8/1972 | Tanabe | ................... | H04N 5/932 386/E5.041 |
| 5,269,313 A * | 12/1993 | DePinto | ................... | A61B 5/30 708/320 |
| 9,917,607 B1 * | 3/2018 | Zhang | ................... | H04L 25/085 |
| 2006/0120491 A1 * | 6/2006 | Yen | ....................... | H03G 3/3089 375/345 |
| 2018/0358953 A1 * | 12/2018 | den Besten | .......... | H04B 1/1036 |

* cited by examiner

*Primary Examiner* — Lihong Yu
(74) *Attorney, Agent, or Firm* — Lowenstein Sandler LLP

(57) ABSTRACT

Systems, methods, and devices for performing predictive baseline wander correction are described. A digital signal may be demodulated to obtain an estimated transmitted symbol stream, based on which an amount of baseline wander error may be predicted. The predicted amount of baseline wander error may be used to correct for baseline wander.

14 Claims, 7 Drawing Sheets

PREDICTIVE BASELINE WANDER CORRECTION

TECHNICAL FIELD

The present disclosure generally relates to processing of high-speed data transmissions, and more specifically, to improved techniques for reducing baseline wander (BLW) in high-speed data transmissions.

BACKGROUND

High-speed data transmission (e.g., as may be performed in network or inter-device communication systems) may be carried out over various communication channels (e.g., electrical and/or optical channels). Such communication channels may carry modulated waveforms—for example, using an amplitude modulation scheme—that represent the data being communicated. The amplitude of a received waveform, however, may drift (or experience a DC-offset) on account of different sources of noise, including for example, temperature effects, power supply interference, use of transimpedance amplifiers (TIAs), and/or high-pass filter elements in the communication channel.

The presence of high-pass filter elements (e.g., AC-couplings, DC-blocks, or control loops) in the communication channel (or communication link), in particular, may introduce an error in the received waveform known as "baseline wander" (or BLW). For example, the transmission of a long sequence of symbols with a constant value will generate a waveform with a constant level (i.e., having a DC component), but the received waveform will decay towards zero on account of the high-pass filter elements in the communication channel. This baseline wander effect may lead to a reduced average bit-error-rate (BER) of the communication channel and, in some cases, may cause burst errors (e.g., in the event of rapid changes in the DC-content of the data being transmitted). Furthermore, because the effects of baseline wander are data dependent and can manifest relatively quickly (as compared to other sources of noise), traditional methods for controlling transmission drift fall short.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
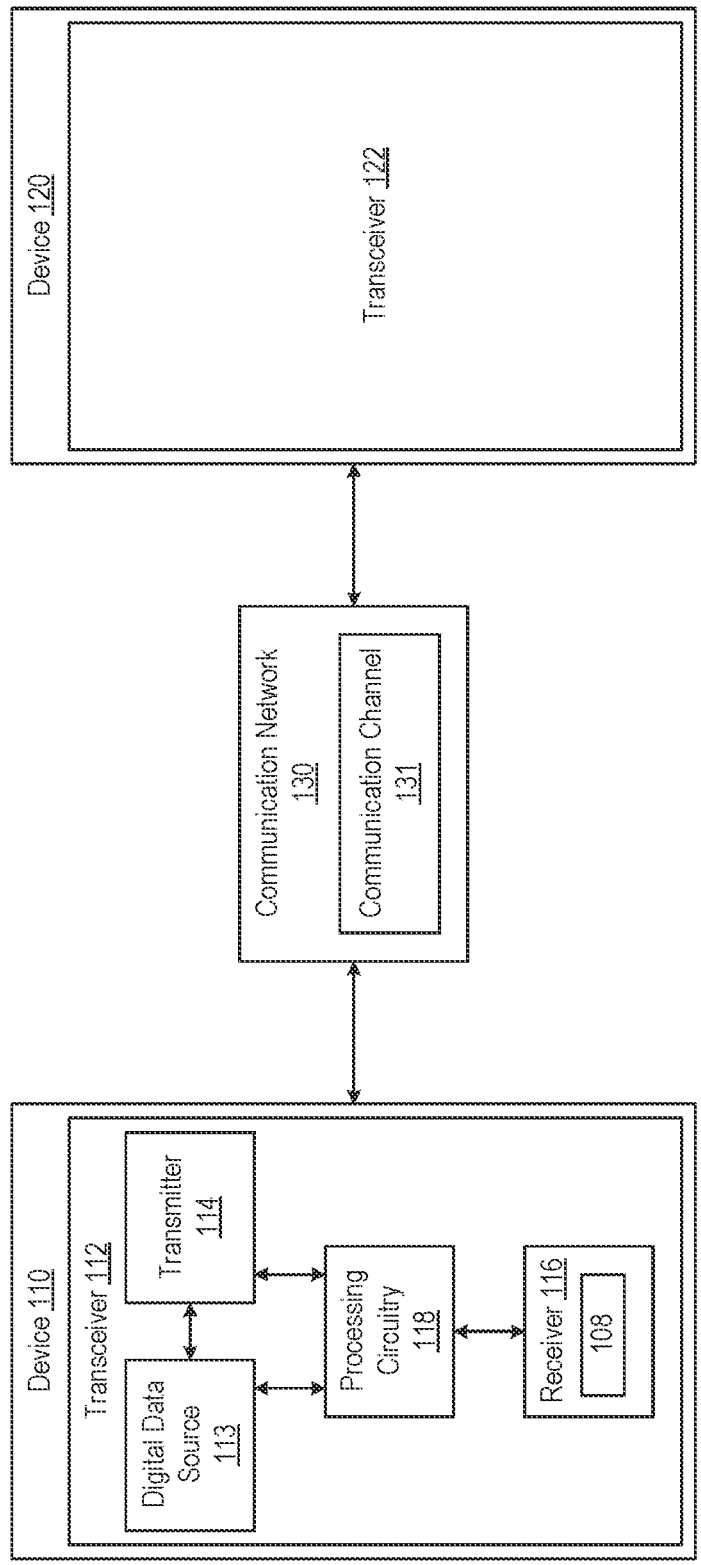
FIG. 1 illustrates an example network communication system in which predictive baseline wander correction may be performed, in accordance with at least some embodiments.

FIG. 1 illustrates an example communication system 100, in accordance with at least some embodiments. Communication system 100 may include device 110 and device 120 that may be connected to, and communicate over, communication network 130. Devices 110 and 120 may correspond to any appropriate type of device capable of communication with other devices connected to a common communication network 130. In some embodiments, for example, device 110 and device 120 may correspond to one or more of a Personal Computer (PC), a laptop, a tablet, a smartphone, a server, a collection of servers, or the like. As another example, in some embodiments, device 110 and device 120 may correspond to servers offering information resources, services and/or applications to user devices, client devices, or other hosts or clients in communication system 100.

Communication network 130 may enable data transmission between devices 110 and 120. In some embodiments, for example, communication network 130 may be an Internet Protocol (IP) data network, an Ethernet network, an InfiniBand (IB) network, a Fibre Channel network, the Internet, a cellular communication network, a wireless communication network, or a combination thereof (e.g., Fibre Channel over Ethernet), variants thereof, and/or the like. In some embodiments, communication network 130 may enable data transmission between devices 110 and 120 across communication channel 131 (e.g., comprising one or more electrical channels, optical channels, and/or other communication channels).

In some cases, data may be communicated as a modulated waveform (e.g., where the data being encoded is encoded into symbols for transmission). In some embodiments, for example, an amplitude modulation technique (e.g., pulse amplitude modulation (PAM)) may be used to encode data in a transmission waveform. The amplitude of a received waveform (e.g., a transmission waveform received after communication across communication channel 131), however, may drift (or experience a DC-offset) on account of different sources of noise, including for example, temperature effects, power supply interference, use of transimpedance amplifiers (TIAs), and/or high-pass filter elements in communication channel 131. The presence of high-pass filter elements (e.g., AC-couplings, DC-blocks, or control loops), in particular, may introduce an error in the received waveform known as "baseline wander" (or BLW). As described in further detail herein, devices 110 and 120 may employ predictive correction techniques to minimize and/or eliminate the impact of such baseline wander effects (and/or other predictable DC-offsets).

Device 110 may include a transceiver 112 for transmitting and receiving signals, including for example, data signals, over a communication network 130. The data signals may include analog, digital, optical, and/or wireless signals, which may be modulated with data, and/or any other suitable signals for carrying data. Transceiver 112 may include a digital data source 113, a transmitter 114, a receiver 116, and processing circuitry 118 that may control transceiver 112. Digital data source 113 may include suitable hardware and/or software for outputting data in a digital format (e.g., in binary code and/or thermometer code). The digital data output by the digital data source 113 may be retrieved from memory (not illustrated) or generated according to an input (e.g., user input).

Transmitter 114 may include suitable software and/or hardware for receiving digital data from a digital data source 113 and outputting a waveform according to the digital data that may be transmitted over communication channel 131 of communication network 130, for example, to device 120.

Receiver 116 may include suitable software and/or hardware for receiving waveforms from communication channel 131 of communication network 130, for example, from device 120. In some embodiments, for example, receiver 116 may include components for receiving and processing waveforms to extract data signals contained therein. The extracted data signals may be stored in a memory (e.g., of receiver 116 and/or device 110). By way of example, in some embodiments, receiver 116 may include a component to capture a waveform from communication channel 131 (e.g., a photodetector for detecting and capturing an optical waveform from an optical communication channel). The captured waveform, which may be modulated with data (e.g., according to an amplitude modulation scheme), may be passed to an analog-to-digital converter (ADC) that may be used to sample the incoming waveform and generate a digital signal therefrom. The digital signal may be equalized, for example, to improve a signal-to-noise ratio. The equalized signal may be passed along to initial demodulation circuitry (e.g., which may be part of a clock recovery block or circuit) that may generate an estimated transmitted symbol stream (e.g., comprising a series of preliminary symbol determinations). The equalized signal may also continue along a main data path where it may undergo further processing (e.g., further equalization) before passing through final demodulation circuitry that may output a symbol stream (e.g., comprising a series of final symbol determinations. Ultimately, the symbols may be decoded to obtain the transmitted data.

As noted above, communication channel 131 may include one or more high-pass filter elements that may produce a baseline wander (BLW) error in the received waveform (and the digital signals derived therefrom). Receiver 116 may employ a number of BLW correction techniques to account for such errors. In some embodiments, for example, receiver 116 may include baseline wander prediction circuitry 108 that may use the preliminary symbol determinations (i.e., in the estimated transmitted symbol stream produced by the initial demodulation circuitry) to calculate (or predict) an amount of BLW that would have been introduced in the received waveform (e.g., on account of their transmission over communication channel 131). In some embodiments, for instance, the estimated transmitted symbol stream may be used to excite a low-pass filter that may model a BLW error transfer function of communication channel 131 (e.g., based on characteristics of the one or more high-pass filter elements provided therein). The BLW error determined by the baseline wander prediction circuitry 108 may be used to correct for baseline wander. In some embodiments, for example, feed-forward correction may be performed, e.g., where the BLW error is used to correct (or adjust) the equalized data signal. In some embodiments, the predicted BLW error may additionally (or alternatively) be used to adjust the operation of the initial demodulation circuitry and/or to correct (or adjust) the incoming waveform. Additional detail regarding the baseline wander prediction circuitry 108 that may be employed by receiver 116 is provided herein (e.g., with reference to the communication devices in FIGS. 3-5).

Processing circuitry 118 may include software, hardware, or a combination thereof, for controlling the operation of the transceiver 112. In some embodiments, processing circuitry 118 may send and/or receive signals to and/or from other elements of transceiver 112 (e.g., digital data source 113, transmitter 114, and/or receiver 116) to control the overall operation of transceiver 112. In some embodiments, processing circuitry 118 may include a memory including executable instructions and a processor (e.g., a microprocessor) that executes the instructions on the memory. The memory may correspond to any suitable type of memory device or collection of memory devices configured to store instructions, including for example, Flash memory, Random Access Memory (RAM), Read Only Memory (ROM), variants thereof, combinations thereof, or the like. In some embodiments, the memory and processor may be integrated into a common device (e.g., a microprocessor may include integrated memory). In some embodiments, processing circuitry 118 may, additionally or alternatively, include an application-specific integrated circuit (ASIC) or other hardware. In some embodiments, processing circuitry 118 may include an Integrated Circuit (IC) chip, a CPU, a GPU, a DPU, a microprocessor, a Field Programmable Gate Array (FPGA), a collection of logic gates or transistors, resistors, capacitors, inductors, diodes, or the like. Some or all of the processing circuitry 132 may be provided on a Printed Circuit Board (PCB) or collection of PCBs. It will be appreciated that any appropriate type of electrical component or collection of electrical components may be suitable for inclusion in processing circuitry 118. In some embodiments, transceiver 112 (or selected elements thereof) may take the form of a pluggable card or controller for device 110. In some embodiments, for instance, transceiver 112 (or selected elements thereof) may be implemented on a network interface card (NIC).

Device 120 may include a transceiver 122 for sending and receiving signals, including for example, data signals, over communication network 130. Transceiver 122 may have a same or similar structure to that of transceiver 112, and so, for the sake of brevity, the structure, function, and operation of transceiver 122 are not separately described herein.

Furthermore, although not explicitly shown, it will be appreciated that devices 110 and 120 and the transceivers 112 and 122 may include other processing devices, storage devices, and/or communication interfaces generally associated with computing tasks, such as sending and receiving data.

Figure 2:
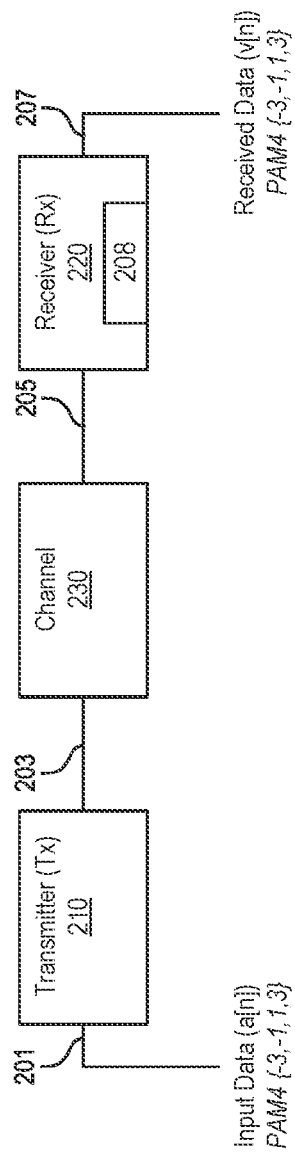
FIG. 2 is a block diagram of a communication system in which predictive baseline wander correction may be performed, in accordance with at least some embodiments.

FIG. 2 illustrates a block diagram of an example communication system 200, in accordance with at least some embodiments. Communication system 200 may include a transmitter 210, a receiver 220, and a communication channel 230. Transmitter 210 may generate a signal conveying information, which after being transmitted over communication channel 230, may be received and recovered by receiver 220. Information in the form of symbols may be embedded in the signal by transmitter 210, which may be recovered by receiver 220 (along with a symbol frequency, phase, and/or timing).

Transmitter 210, for example, may receive 201 input data (a[n]) and transmit 203 the input data onto communication channel 230. In some cases, a modulation scheme may be employed to vary the properties of a signal being transmitted and encode information thereby. In some embodiments, for example, an amplitude modulation technique may be used to encode information via an amplitude of a signal that is transmitted. For example, each of a specified number of amplitude levels may correspond to a particular symbol in a set of data symbols, where each symbol may represent a unique sequence of coded binary data. For example, as illustrated in FIG. 2, transmitter 210 may receive 201 input data as a signal modulated according to a PAM4 modulation scheme.

In a PAM 4 modulation scheme, a signal may take on one of four unique amplitude levels (e.g., {−3, −1, 1, 3}) that correspond to different transmitted symbols (e.g., {0, 1, 2, 3}), with each symbol in the symbol alphabet representing a combination of binary bits of data (e.g., {00, 01, 10, 11}). It will be appreciated that the use of a PAM4 modulation scheme (or other PAM modulation schemes) in the description provided herein is by way of example and that other data modulation schemes can be used in accordance with embodiments of the present disclosure, including for example, a non-return-to-zero (NRZ) modulation scheme, PAM4, PAM8, PAM16, etc. For example, where an NRZ modulation scheme is used, the transmitted data signal may consist of two symbols (e.g., −1 and 1), with each symbol value representing a binary bit (e.g., 0 and 1).

Communication channel 230 may enable data transmission between transmitter 210 and receiver 220. In some embodiments, for example, communication channel 230 may be an electrical communication channel, an optical communication, or other communication channels. In some embodiments, communication channel 230 may be over a serial link (e.g., a cable, printed circuit boards (PCBs) traces, copper cables, optical fibers, or the like), high-speed serial links, read channels for data storage (e.g., hard disk, flash solid-state drives (SSDs), deep space satellite communication channels, or the like.

Receiver 220 may receive 205 an incoming signal from communication channel 230 and output 107 received data (v[n]). In some cases, communication channel 230 may include one or more high-pass filter elements that may introduce a baseline wander (BLW) effect in the incoming signal received by receiver 220. In some embodiments, receiver 220 may include baseline wander prediction circuitry 208 that may calculate (or predict) an amount of BLW error that would have been introduced in the incoming signal (e.g., due to transmission over communication channel 230). The BLW error determined by the baseline wander prediction circuitry 208 may be used to correct for baseline wander. Additional detail regarding the baseline wander prediction circuitry 208 that may be employed by receiver 220 is provided herein (e.g., with reference to the communication devices in FIGS. 3-5).

Figure 3:
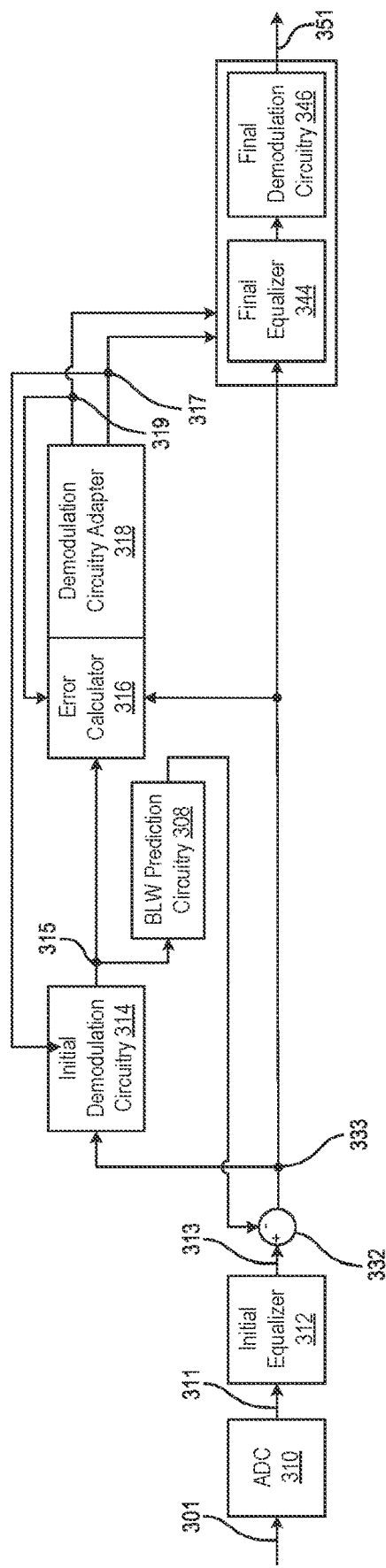
FIG. 3 is a block diagram of a first example of a computing device including baseline wander prediction circuitry, in accordance with at least some embodiments.

FIG. 3 is a block diagram of an example computing device 300, in accordance with at least some embodiments. As illustrated in FIG. 3, computing device 300 may include an analog-to-digital converter, or ADC 310, an initial equalizer 312, initial demodulation circuitry 314, an error calculator 316, a demodulation circuitry adapter 318, a final equalizer 344, and final demodulation circuitry 346, along with a BLW prediction circuitry 308 and BLW correction circuitry in the form of adder 332. BLW prediction circuitry 308 may be used to calculate an amount of baseline wander error expected in a received signal, which may be used in a feed-forward manner to correct the received signal (i.e., in the digital domain).

ADC 310 may receive an incoming waveform 301, for example, from a communication channel (e.g., from an electronic and/or optical channel) and may operate to sample the incoming waveform 301 and generate a digital signal 311 (which may be represented as z[n]). The incoming waveform 301, for example, may be an analog waveform (e.g., a voltage waveform captured by a photodetector coupled to an optical channel) that ADC 310 may sample (e.g., measure an amplitude of incoming waveform 301) at periodic intervals and assign a digital value to each sample to generate digital signal 311. ADC 310 may provide digital signal 311 to initial equalizer 312.

Initial equalizer 312 may receive digital signal 311 and may operate to equalize the digital signal 311 (e.g., to improve a signal-to-noise ratio (SNR)) and generate an equalized signal 313 therefrom (which may be represented as ffe_z[n]). In some embodiments, initial equalizer 312 may also operate to scale the values such that they fall within a desired range (e.g., between −1024 and 1023, which may be represented as an 11-bit signed integer). In some embodiments, initial equalizer 312 may include a linear feed-forward equalizer (FFE), which may take the form of a finite impulse response (FIR) filter. In some embodiments, initial equalizer 312 may additionally, or alternatively, include a continuous-time linear equalizer (CTLE). It will be appreciated that other equalizers may be included in addition to, or in place of, those mentioned depending on the embodiment and its application. Initial equalizer 312 may provide equalized signal 313 to adder 320 along a main data path.

Adder 332 may receive equalized signal 313 along with BLW error 309, which may represent an amount of BLW error that is calculated (or predicted) predicted by BLW prediction circuitry 308, as discussed in further detail below. Adder 332 may operate to correct (or adjust) the equalized signal 313 to generate corrected signal 333 (which may be represented as blw_z[n]). Adder 332, for example, may subtract BLW error 309 from equalized signal 313 (e.g., ffe_z[n]-blw_e[n]) to generate corrected signal 333. Adder 332 may provide corrected signal 333 to initial demodulation circuitry 314 and error calculator 316, as well as further along the main data path (e.g., where it may undergo further processing before a final symbol determination is made).

Initial demodulation circuitry 314 may receive corrected signal 333 and may operate to demodulate corrected signal 333 and generate an estimated transmitted symbol stream, or demodulated signal 315, therefrom (which may be represented as ŷ[n]). Demodulated signal 315 may contain a series of preliminary symbol determinations corresponding to the sample values in corrected signal 333. For example, for each value in corrected signal 333, initial demodulation circuitry 314 may make a preliminary determination as to a corresponding symbol encoded thereby. In some embodiments, for instance, corrected signal 333 may carry information encoded using an amplitude modulation scheme (e.g., as a PAM modulation scheme). Based on a value of corrected signal 333, initial demodulation circuitry 314 may determine a corresponding symbol in the amplitude modulation scheme (e.g., in a corresponding PAM alphabet).

In some embodiments, for example, initial demodulation circuitry 314 may take the form of a slicer that may compare the value of corrected signal 333 to a set of threshold values (or slicer levels)—which may mark the boundary between amplitude ranges for each symbol in the symbol alphabet—to make a symbol determination. For instance, in some embodiments, corrected signal 333 may carry information encoded according to a PAM4 modulation scheme, which may map amplitude levels (which may be represented as vector eth, e.g., eth={−3, −1, +1, +3}) to a four-symbol alphabet (which may be represented as vector a, e.g., an unbalanced alphabet: $\alpha=\{0, 1, 2, 3\}$ or a balanced alphabet: $\alpha=\{-3, -1, 1, 3\}$). In such cases, the slicer may apply three slicer levels (which may be represented as vector yth, e.g., yth={−2, 0, 2}) to make a preliminary symbol determination. In some embodiments, slicer levels 317 may be provided as an input to initial demodulation circuitry 314 (e.g., by demodulation circuitry adapter 318, which may adapt the slicer levels 317 as described below). The demodulated signal 315 containing the preliminary symbol determinations may be provided to error calculator 316 and demodulation circuitry adapter 318, as well as BLW prediction circuitry 308.

Error calculator 316 may receive corrected signal 333, demodulated signal 315, and a set of amplitude levels 319 (e.g., from demodulation circuitry adapter 318, which may adapt the amplitude levels 319 as described below) and may operate to determine an error between corrected signal 333 and a corresponding amplitude level and generate an error signal therefrom (which may be represented as e[n]). In some embodiments, for example, error calculator 316 may compare a value of corrected signal 333 (blw_z[n]) to a level in the set of amplitude levels 319 corresponding to the preliminary symbol determination of demodulated signal 315 (eth[ŷ[n]]) to determine an error (e.g., an amount of difference (blw_z[n]−eth[ŷ[n]]), a sign of the difference (sign((blw_z[n]−eth[ŷ[n]]))), or a ratio (blw_z[n]/eth[ŷ[n]]) or percentage difference (1−(blw_z[n]/eth[ŷ[n]]))). The error determined by error calculator 316 may be provided as an error signal to demodulation circuitry adapter 318.

Demodulation circuitry adapter 318 may receive the error signal and demodulated signal 315 from error calculator 316 and may operate to adapt slicer levels 317 (yth) and amplitude levels 319 (eth). In some embodiments, for example, demodulation circuitry adapter 318 may include an integrator that may accumulate an error for each amplitude level in the modulation scheme over a number of samples (e.g., across 128 samples). The output of the integrator may then be used to adapt amplitude levels 319 (e.g., adding the accumulated error or an average accumulated error for each amplitude level to current amplitude levels 319).

In some embodiments, for instance, demodulation circuitry adapter 318 may include a gradient multiply-accumulator (or GMAC) that may accumulate the error signal received from error calculator 316 based on demodulated signal 315. By way of example, where a PAM4 modulation scheme is employed, and the error signal (e[n]) is a sign of the difference between corrected signal 333 and an amplitude level in the set of amplitude levels 319 corresponding to the preliminary symbol determination of demodulated signal 315 (eth[ŷ[n]]). In some cases, the accumulated error may be scaled by a scaling factor ($Y_{scale}$), which may be adjusted to control a speed of adaption. The operation of the GMAC may be expressed as follows:

$$k \in \alpha = \{0, 1, 2, 3\} \quad \text{Eq. 1}$$

$$grad(k, n) = \begin{cases} e[n], & \hat{y}[n] = k \\ 0, & \text{otherwise} \end{cases} \quad \text{Eq. 2}$$

$$grad(k) = \sum_{n=1}^{N_{seg}} grad(k, n), \quad \text{Eq. 3}$$

$$N_{seg} = 128$$

$$eth[k] \mathrel{+}= Y_{scale} * grad(k) \quad \text{Eq. 4}$$

In some cases, the GMAC may adjust the accumulated errors based on a probability of each amplitude level (which may be presented as p). For example, in a PAM4 modulation scheme, the following amplitude-level probabilities may be used:

$$\left\{\frac{1}{4}, \frac{1}{4}, \frac{1}{4}, \frac{1}{4}\right\},$$

in which case the eth adaptation may be expressed as follows:

$$eth[k] \mathrel{+}= \frac{Y_{scale} * grad(k)}{p(k)} \quad \text{Eq. 5}$$

Demodulation circuitry adapter 318 may use the adapted amplitude levels 319 to adapt slicer levels 317. In some embodiments, for example, demodulation circuitry adapter 318 may bisect adapted amplitude levels 319 to obtain adapted slicer levels 317 (e.g., the midpoint between adapted amplitude levels 319). The adapted slicer levels 317 and amplitude levels 319 may be fed back to initial demodulation circuitry 314 and error calculator 316, respectively, and passed along to other components on the main data path (e.g., to final equalizer 344, and/or final demodulation circuitry 346). While such closed-loop adaptation of the slicer levels 317 used by initial demodulation circuitry 314 may generally be able to compensate for drift in a received waveform, their adaptation may not occur quickly enough to respond to certain sources of noise, specifically certain baseline wander events (e.g., in the event of rapid changes in the DC-content of the data being transmitted).

Figure 6:
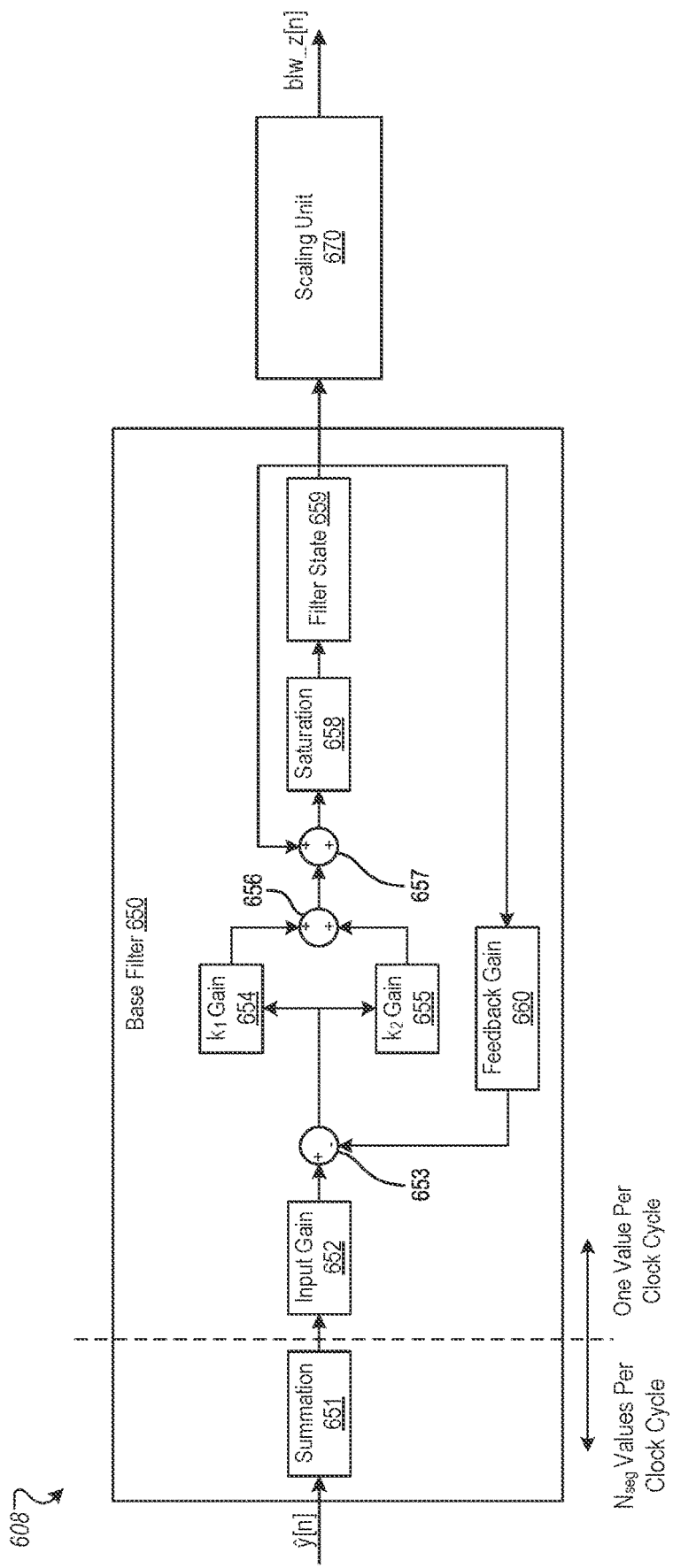
FIG. 6 is a block diagram of an example predictive filter for predicting baseline wander, in accordance with at least some embodiments.

BLW prediction circuitry 308 may receive demodulated signal 315 and may operate to calculate (or predict) an amount of BLW expected in incoming waveform 301 (and digital signals derived therefrom, e.g., digital and equalized signals 311, 313), or BLW error 309 (which may be represented as blw_e[n]). In some embodiments, for example, the preliminary symbol determinations of demodulated signal 315 may be used to excite a low-pass filter that models an error transfer function of the communication channel on which the incoming waveform 301 is carried (as described below). In some embodiments, the low-pass filter (or predictive filter) may be realized as an IIR filter (e.g., as illustrated in FIG. 6 and described with respect thereto). The predicted BLW error 309 obtained from the predictive filter may then be used to compensate for baseline wander effects (e.g., by correcting equalized signal 313). The predicted BLW error 309 generated by BLW prediction circuitry 308, for example, may be provided to adder 332 along the main data path such that corrected signal 333 is provided to initial demodulation circuitry 314 and error calculator 316.

More particularly, as discussed above, BLW error may be introduced in a received waveform due to the presence of one or more high-pass filter (HPF) elements (e.g., AC-couplings, DC-blocks, or control loops) in the communication channel used to carry the waveform. Each pulse in a PAM-modulated data transmission, for example, may have a non-zero integral and, thus, will introduce an error in the received waveform (i.e., on account of the high-pass filter elements in the communication channel). The sum of such errors (e.g., for each pulse transmitted) may constitute the BLW error.

The error transfer function of a communication channel may be expressed as the difference between a transparent communication channel (H(f)=1) and a communication channel having one or more high pass filter elements therein ($H_{HP}(f)$). For example, in the case of a communication channel having a single high-pass filter element (e.g., a single AC-coupling) at frequency $f_{ch}$ and a channel gain of $G_{ch}$, the error transfer function at the receiver may be represented as follows:

$$H_{err}(f) = G_{ch}(1 - H_{HP}(f)) = G_{ch}\left(\frac{\frac{jf}{f_{ch}}}{1 + \frac{jf}{f_{ch}}} - 1\right) = -G_{ch}\frac{1}{1 + \frac{jf}{f_{ch}}} \qquad \text{Eq. 6}$$

which is equivalent to a low-pass filter with a pole equal to that of the high-pass filter element (i.e., at frequency $f_{ch}$). Thus, in some embodiments, BLW error 309 may be determined by exciting a predictive low-pass filter (or predictive filter) that models the error transfer function of Eq. 6 with the preliminary symbol determinations in demodulated signal 315 (which may serve as a reasonable proxy for the actual pulse that was transmitted).

In some cases, the frequency $f_{ch}$ of the high pass filter element and channel gain $G_{ch}$ may be known, which may allow for the frequency $f_{blw}$ and gain $G_{blw}$ parameters of the predictive filter to be set precisely. In other cases, the channel characteristics may not be known and/or may only be approximated, and the frequency $f_{blw}$ and gain $G_{blw}$ parameters of the predictive filter may be determined approximately and (optionally) further tuned for optimal operation, e.g., through a calibration process. In some embodiments, for example, a calibration process may correlate BLW error 409 with an estimated amount of BLW error remaining after correction (e.g., in corrected signal 433). A positive correlation, for instance, may indicate that $G_{blw}$ is too large, whereas a negative correlation may indicate that $G_{blw}$ is too small.

The desired gain, $G_{des}$, of the predictive filter, for example, may be the product of a transmit amplitude, $A_{Tx}$, and the channel gain, $G_{ch}$, which in some embodiments, may be approximated using amplitude levels 319. In some embodiments, for example, the desired gain, $G_{des}$, may be computed as a ratio between a particular level in the (DC balanced) receiver alphabet and a corresponding amplitude level in amplitude levels 319. For example, where a PAM4 modulation scheme is used, the desired gain may be computed as follows:

$$G_{des} = \frac{eth_4}{\hat{y}_4} \qquad \text{Eq. 7}$$

where $\hat{y}_4$ is an upper level in a balanced PAM4 alphabet (e.g., $\hat{y}_4=3$) and $eth_4$ is a corresponding amplitude level in amplitude levels 319.

In some embodiments, an average of the demodulated signal 315 over a segment of symbols (e.g., $N_{seg}=64$ symbols) may be used to excite the predictive filter without incurring a significant performance penalty, as the BLW error contribution from any individual symbol may be relatively small. In some embodiments, for example, computing device 300 may operate on a multiplexed data stream on a reduced clock (e.g., where computing device 300 is incorporated into a receiver). In such cases, an average of the demodulated signal 315, for example, over a segment size equivalent to the multiplexing ratio of the data stream, may be used to excite the predictive filter. In alternative implementations, the same effect may be realized by exciting the predictive filter with a sum of the demodulated signal 315 over the segment of symbols and scaling the desired gain, $G_{des}$, accordingly:

$$G_{des} = \frac{eth_4}{N_{seg}\hat{y}_4} \qquad \text{Eq. 8}$$

Likewise, in some cases, the pole frequency, $f_{ch}$, of the high-pass filter element in the communication channel may not be precisely known. In such instances, an approximate pole value, $f_{blw}$, may be used for the predictive filter. But if the approximation of $f_{blw}$ is too small (or too large), the magnitude of the BLW error determined by the predictive filter may be proportionally reduced (e.g., resulting in underestimation (or overestimation) of the BLW error). Accordingly, in some embodiments, the predictive filter gain may be adjusted by a scaling factor $f_{scaling}$, which for example, may represent a ratio of the high-pass filter pole frequency, $f_{ch}$, to the approximate pole frequency of the predictive filter, $f_{blw}$:

$$f_{scaling} = \frac{f_{ch}}{f_{blw}} \qquad \text{Eq. 9}$$

A predictive filter with approximate pole frequency $f_{blw}$, thus, may have the following gain:

$$G_{blw} = \frac{eth_4}{\hat{y}_4} \cdot \frac{f_{ch}}{f_{blw}} \qquad \text{Eq. 10}$$

The scaling factor $f_{scaling}$ may help to produce a correct error magnitude in the first instance, though the error roll-off may remain incorrect. However, because the time constant of the prediction filter may be relatively long compared to a pulse length, any residual error may average out over a long timescale (e.g., if the transmitted signal exhibits symbol balance over a long period of time).

In some cases, the scaling factor $f_{scaling}$ may be determined through simulation, while in practice, the scaling factor $f_{scaling}$ may be determined through a calibration process. For example, through calibration, an optimal scaling factor $f_{scaling}$ may be chosen that balances an instantaneous error (e.g., the initial error magnitude produced by a transmitted pulse) and long-term error (e.g., a residual error resulting from incorrect error roll-off). Accordingly, in some cases, it may be advantageous to include an additional scaling factor, beyond $f_{scaling}$, so as to better control the instantaneous effects of BLW error (e.g., when using a single-pole filter in place of a multi-pole filter, as discussed below). Moreover, while calibration may generally look to estimate and tune both a frequency $f_{blw}$ and gain $G_{blw}$ (e.g., through adjustment of $f_{scaling}$) of the predictive filter, it is their combined effect that is critical in determining effective filter parameters (e.g., that accurately predict BLW error 309). That is, a mistuning of $f_{blw}$ (e.g., within a decade) may be compensated for through adjustment of $G_{blw}$ (and vice versa). Furthermore, because the predictive filter may be characterized by these two stable parameters, BLW error 309 may be determined relatively quickly (e.g., as compared to the closed-loop compensation performed by demodulation circuitry adapter 318 through adaptation of slicer levels 317), allowing for effective control of baseline wander (e.g., even when sudden transmit data induced baseline wander events are experienced).

While the foregoing description of the predictive filter was made with reference to a communication channel having a single high-pass frequency element, it may be the case that the communication channel contains multiple, cascaded high-pass frequency elements (e.g., n elements, each having pole frequency $f_{ch,n}$). In such cases, an ideal prediction filter may have a similar number of poles. In some embodiments, for example, a series of n cascaded, low-pass filters with the same pole frequencies (e.g., $f_{ch,1}$ to $f_{ch,n}$) may be used to calculate BLW error 309. Implementation of a multipole prediction filter, however, may be computationally heavy and tuning may be relatively complex. Therefore, in some embodiments, a single-pole prediction filter may be used instead that is tuned to fit the impulse response of an ideal multipole prediction filter. A single-pole prediction filter, for example, may be tuned such that the amplitude of its impulse response and the first derivative of its impulse response fit the impulse response of the multi-pole filter. This tuning may be affected through an additional scaling factor, beyond $f_{scaling}$, as noted above.

Returning to the main data path, final equalizer 344 may receive corrected signal 333 and operate to equalize corrected signal 333 and generate a further equalized signal 345 therefrom (which may be represented as dffe_z[n]). In some embodiments, final equalizer 344 may include a reflection canceller. It will be appreciated that other equalizers may be included in addition to, or in place of, those mentioned depending on the embodiment and its application. Final equalizer 344 may provide equalized signal 345 to final demodulation circuitry 346.

Final demodulation circuitry 346 may receive further equalized signal 345 and may operate to demodulate further equalized signal 345 and generate a final demodulated signal 351 therefrom (which may be represented as â[n]). Final demodulated signal 351 may contain a series of final symbol determinations corresponding to the equalized sample values in equalized signal 345. In some embodiments, for example, final demodulation circuitry 346 may employ simple symbol by symbol detection, a full Viterby decoder, or approximate Viterby decoding to determine a corresponding symbol for each value in further equalized signal 345. Final demodulation circuitry 346 may output a final demodulated signal 351, for example, to a decoder that may decode the final symbol determination (e.g., to obtain the transmitted data encoded thereby).

It will be appreciated that in some embodiments computing device 300 may be included or incorporated into a larger system or device, including for example, a serializer/deserializer (SerDes) device, a receiver, a transceiver, a network communication system, and/or other system or device in which high-speed data transmissions may be received. Furthermore, because BLW correction is performed in the digital domain at an early stage of data transmission processing, other components or processing blocks of those systems or devices may benefit, including for example, a clock-recovery and/or a symbol detector component.

Figure 4:
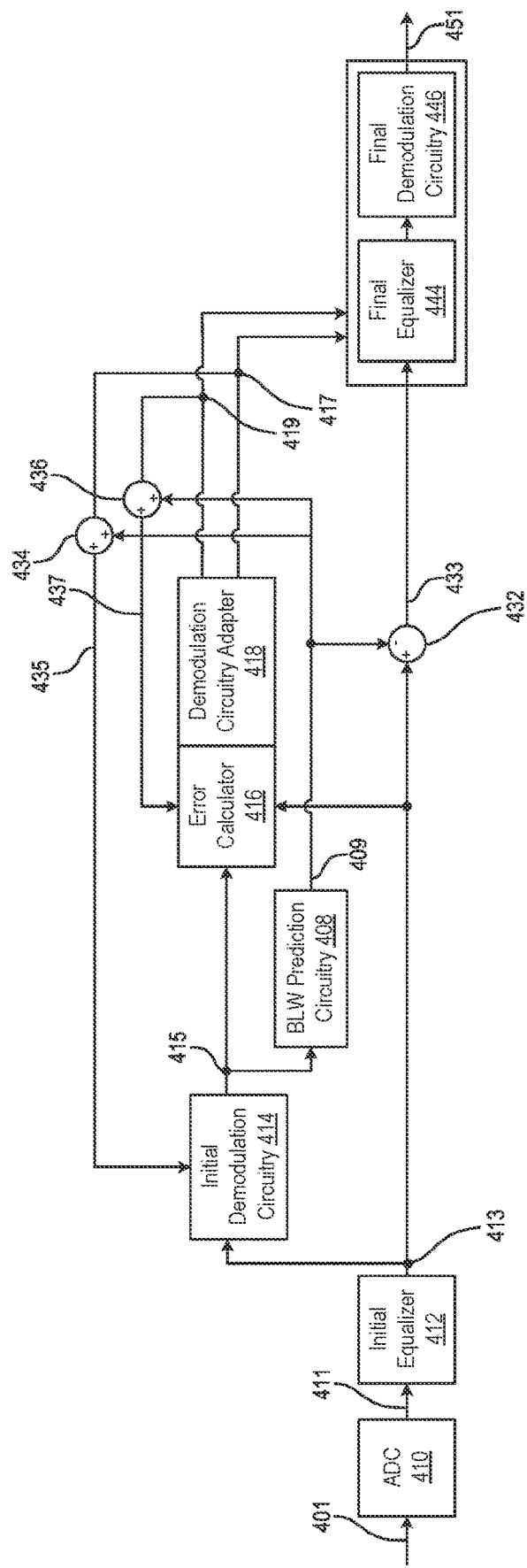
FIG. 4 is a block diagram of a second example of a computing device including baseline wander prediction circuitry, in accordance with at least some embodiments.

Moreover, while FIG. 3 illustrates a particular embodiment of computing device 300, it will be appreciated that other embodiments and/or variations thereof may fall within the scope of the present disclosure. In other embodiments, for example, the BLW error 309 generated by BLW prediction circuitry 308 may be used to adjust the equalized signal 313 at other locations further along the main data path. As previously noted, initial demodulation circuitry 314 may be provided as part of a clock recovery block or circuit and correcting the equalized signal 313 before it reaches initial demodulation circuitry 314 may impose certain timing constraints from an implementation perspective. By correcting the equalized signal 313 further along the main data path, these timing constraints may be relaxed and implementation complexity may be reduced. In some embodiments, for example, adder 332 may be re-positioned along the main data path, after the equalized signal 313 is provided to initial demodulation circuitry 314 but before it is provided to error calculator 316, such that corrected signal 333 may be provided to error calculator 316 and demodulation circuitry adapter 318. In this way, the BLW prediction circuitry 308 may still precondition the signal used by error calculator 316 and demodulation circuitry adapter 318 for closed-loop estimation (i.e., for adaptation of slicer levels 317 and amplitude levels 319). In other embodiments adder 332 may be positioned even further along the main data path, for example, after the equalized signal 313 is provided to error calculator 316 but before reaching final equalizer 344 (e.g., as illustrated in FIG. 4 and described with respect thereto). In some embodiments, computing device 300 may include additional correction circuitry to compensate for drift in a received waveform in the analog domain (e.g., a temperature drift). While such correction circuitry may be able to compensate for drift in a received waveform generally, it may operate over a relatively longer time frame (e.g., as compared to the closed-loop adaptation of slicer levels 317) and, thus, may not be able to compensate quickly enough to respond to certain sources of noise, such as baseline wander.

In some embodiments, for example, the additional correction circuitry may perform closed-loop compensation to determine an analog voltage offset (VOS) adjustment. The VOS adjustment may be provided to a DAC to convert the VOS adjustment into analog form. The analog VOS adjustment may then be provided to an adder (e.g., positioned before ADC 310), which may adjust incoming waveform 301. In some embodiments, for instance, the correction circuitry may determine an analog voltage offset (VOS) adjustment using the error signal generated by error calculator 316 and/or the adapted amplitude levels 319 generated by demodulation circuitry adapter 318

In some embodiments, for example, computing device 300 may include an integrator that may accumulate a measured DC-error, to determine the voltage offset adjustment. By way of example, the DC-error for a PAM4 signal may be derived from the mean of all signal levels, i.e., (sum(eth[k]), where k=[0,1,2,3]). In some embodiments, for example, computing device 300 may include a GMAC that may accumulate the error signal from error calculator 316 at a particular amplitude level (e.g., accumulating eth[0] over a segment of 128 symbols). In some embodiments, for example, the GMAC of demodulation circuitry adapter 318 may be used, or an additional GMAC FIG. 4 is a block diagram of an example computing device 400, in accordance with at least some embodiments. As illustrated in FIG. 4, computing device 400 may include an analog-to-digital converter, or ADC 410, an initial equalizer 412, an initial demodulation circuitry 414, an error calculator 416, a demodulation circuitry adapter 418, a final equalizer 444, and final demodulation circuitry 446, along with BLW prediction circuitry 408 and BLW correction circuitry in the form of adders 432, 434, 436. Computing device is similar to that of computing device 300, but the baseline wander error calculated by BLW prediction circuitry 408 is used to correct equalized signal 413 further along the main data path (e.g., after being provided to initial demodulation circuitry 414 but before reaching final equalizer 444) and is provided in a feed-forward manner to correct the slicer levels 417 and amplitude levels 419 (i.e., provided to initial demodulation circuitry 414). As previously noted, correcting equalized signal 413 before it reaches initial demodulation circuitry 414 may impose certain timing constraints from an implementation perspective, but by correcting the equalized signal 413 further along the main data path, these timing constraints may be relaxed and implementation complexity may be reduced. The computing blocks of computing device 400 (e.g., ADC 410, initial equalizer 412, initial demodulation circuitry 414, error calculator 416, demodulation circuitry adapter 418, final equalizer 444, final demodulation circuitry 446, and BLW prediction circuitry 408) are similar to those of computing device 300, and so, for the sake of brevity, their structure, function, and operation are not repeated herein, except insofar as may be necessary to explain how the computing devices differ.

ADC 410 may receive an incoming waveform 401, for example, from a communication channel, and may operate to sample the incoming waveform 401 and generate a digital signal 411, which may be provided to initial equalizer 412. Initial equalizer 412 may receive digital signal 411 and operate to equalize the digital signal 411 and generate an equalized signal 413 therefrom. Initial equalizer 412 may provide equalized signal 413 to initial demodulation circuitry 414 and error calculator 416, as well as to adder 432 along a main data path.

Initial demodulation circuitry 414 may receive equalized signal 413 and operate to demodulate equalized signal 413 and generate an estimated transmitted symbol stream, or demodulated signal 415, therefrom, (which may be represented as $\hat{y}[n]$). Demodulated signal 415 may contain a series of preliminary symbol determinations corresponding to the equalized sample values in equalized signal 413. For example, for each value in equalized signal 413, initial demodulation circuitry 414 may make a preliminary determination as to a corresponding symbol encoded thereby. In some embodiments, for example, initial demodulation circuitry 414 may take the form of a slicer that may compare the value of equalized signal 413 to a set of threshold values (or slicer levels) to make a symbol determination. In some embodiments, slicer levels 417 may be provided as an input to initial demodulation circuitry 414 (e.g., from adder 434, which may correct slicer levels 417 adapted by demodulation circuitry adapter 418 as described below). The demodulated signal 415 containing the preliminary symbol determinations may be provided to error calculator 416 and demodulation circuitry adapter 418, as well as BLW prediction circuitry 408.

Error calculator 416 may receive equalized signal 413, demodulated signal 415, and a set of amplitude levels 419 (e.g., from adder 436, which may correct amplitude levels 419 adapted by demodulation circuitry adapter 418 as described below) and may operate to determine an error signal between equalized signal 413 and a corresponding amplitude level and generate an error signal therefrom (which may be represented as e[n]). In some embodiments, for example, error calculator 416 may compare a value of equalized signal 413 (ffe_z[n]) to a level in the set of amplitude levels 419 corresponding to the preliminary symbol determination of demodulated signal 415 (eth[$\hat{y}$[n]]) to determine an error (e.g., an amount of difference (ffe_z[n]−eth[$\hat{y}$[n]]), a sign of the difference (sign((ffe_z[n]−eth[$\hat{y}$[n]])), or a ratio (ffe_z[n]/eth[$\hat{y}$[n]]) or percentage difference (1−(ffe_z[n]/eth[$\hat{y}$[n]]))). The error determined by error calculator 416 may be provided as an error signal to demodulation circuitry adapter 418.

Demodulation circuitry adapter 418 may receive the error signal and demodulated signal 415 from error calculator 416 and may operate to adapt slicer levels 417 (yth) and amplitude levels 419 (eth). In some embodiments, for example, demodulation circuitry adapter 418 may include an integrator that may accumulate an error for each amplitude level in the modulation scheme over a number of samples (e.g., across 128 samples). In some embodiments, for instance, demodulation circuitry adapter 418 may include a gradient multiply-accumulator (or GMAC) that may accumulate the error signal received from error calculator 416 based on demodulated signal 415. In some cases, the GMAC may adjust the accumulated errors based on a probability of each amplitude level. Demodulation circuitry adapter 418 may use the adapted amplitude levels 419 to adapt slicer levels 417. In some embodiments, for example, demodulation circuitry adapter 418 may bisect adapted amplitude levels 419 to obtain adapted slicer levels 417. The adapted slicer levels 417 and amplitude levels 419 may be may be passed along to other components on the main data path (e.g., to final equalizer 444, and/or final demodulation circuitry 446), as well as to adders 434, 436, which may adjust the levels based on BLW error 409 determined by BLW prediction circuitry 408 (as described below) before being fed back to initial demodulation circuitry 414 and error calculator 416, respectively.

BLW prediction circuitry 408 may receive demodulated signal 415 and may operate to calculate (or predict) an amount of BLW expected in incoming waveform 401 (and digital signals derived therefrom, e.g., digital and equalized signals 411, 413), or BLW error 409. In some embodiments, for example, the preliminary symbol determinations of demodulated signal 415 may be used to excite a predictive low-pass filter (or predictive filter) that models an error transfer function of the communication channel on which the incoming waveform 401 is carried (e.g., the error transfer function of Eq. 6). In some cases, the frequency and gain characteristics of the communication channel (and high-pass filter element(s) therein) may be known, which may allow the frequency $f_{blw}$ and gain $G_{blw}$ parameters of the predictive filter to be set precisely. In others, the channel characteristics may not be known and/or only be approximated, and the frequency $f_{blw}$ and gain $G_{blw}$ parameters of the predictive filter may be approximated and tuned for optimal operation (e.g., through a calibration process). In some embodiments, the predictive filter may be realized as an IIR filter (e.g., as illustrated in FIG. 6 and described with respect thereto).

The predicted BLW error 409 generated by BLW prediction circuitry 408 may be provided to adders 434 and 436, which may also receive slicer levels 417 and amplitude levels 419 from demodulation circuitry adapter 418, respectively. Adders 434 and 436 may operate to correct (or adjust) the adapted slicer levels 417 and amplitude levels 419 generated by demodulation circuitry adapter 418. Adders 434 and 436, for example, may add BLW error 409 to the adapted slicer levels 417 and amplitude levels 419 (e.g., yth+blw_e[n] and eth+blw_e[n], respectively), which may then be fed back to initial demodulation circuitry 414. In this way, adaptation of slicer levels 417 and amplitude levels 419 may be affected relatively quickly (e.g., as compared to closed-loop adaptation), allowing for effective baseline wander compensation (e.g., even when sudden baseline wander events are experienced). Correction of the slicer levels 417 and amplitude levels 419 may also be preferable in some instances, for example, where computing device 400 is operating on a reduced clock (e.g., where computing device 400 is incorporated into a reduced clock receiver).

Final equalizer 444 may receive corrected signal 433 and operate to equalize corrected signal 433 and generate a further equalized signal 445 therefrom. In some embodiments, for example, final equalizer 444 may include a DFFE, but other equalizers may be included in addition to, or in place thereof, those mentioned depending on the embodiment and its application. Final equalizer 444 may provide further equalized signal 445 to final demodulation circuitry 446.

Final demodulation circuitry 446 may receive further equalized signal 445 and operate to demodulate further equalized signal 445 and generate a final demodulated signal 451 therefrom containing a series of final symbol determinations. In some embodiments, for example, final demodulation circuitry 446 may employ simple symbol by symbol detection, a full Viterby decoder, or approximate Viterby decoding to determine a corresponding symbol for each value in further equalized signal 445. Final demodulation circuitry 446 may output a final demodulated signal 451, for example, to a decoder that may decode the final symbol determination (e.g., to obtain the transmitted data encoded thereby).

It will be appreciated that in some embodiments computing device 400 may be included or incorporated into a larger system or device, including for example, a serializer/deserializer (SerDes) device, a receiver, a transceiver, a network communication system, and/or other system or device in which high-speed data transmissions may be received. Furthermore, while FIG. 4 illustrates a particular embodiment of computing device 400, it will be appreciated that other embodiments and/or variations thereof may fall within the scope of the present disclosure. In some embodiments, for example, computing device 400 may include additional correction circuitry to compensate for drift in a received waveform generally in the analog domain, as described above with respect to computing device 300.

Figure 5:
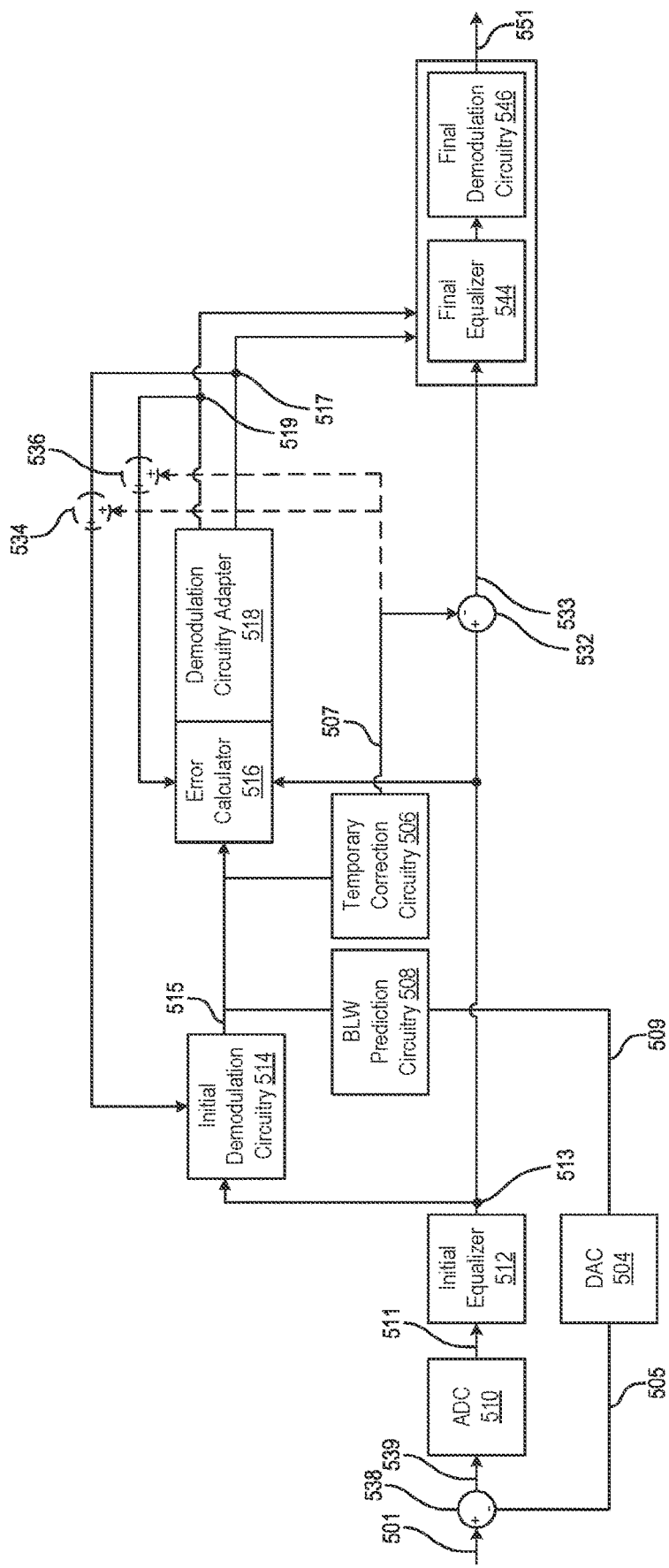
FIG. 5 is a block diagram of a third example of a computing device including baseline wander prediction circuitry, in accordance with at least some embodiments.

FIG. 5 is a block diagram of an example computing device 500, in accordance with at least some embodiments. As illustrated in FIG. 5, computing device 500 may include an analog-to-digital converter, or ADC 510, an initial equalizer 512, an initial demodulation circuitry 514, an error calculator 516, a demodulation circuitry adapter 518, a final equalizer 544, and a final demodulation circuitry 546, along with a BLW prediction circuitry 508, a temporary correction circuitry 506, and BLW correction circuitry in the form of a digital-to-analog converter, or DAC 504, and adders 532, 538. Computing device 500 is similar to that of computing device 300 (of FIG. 3) and computing device 400 (of FIG. 4), but instead of correcting for BLW in the digital domain, the baseline wander error calculated by BLW prediction circuitry 508 is used to correct the incoming waveform 501 in the analog domain. The computing blocks of computing device 500 (e.g., ADC 510, initial equalizer 512, initial demodulation circuitry 514, error calculator 516, demodulation circuitry adapter 518, final equalizer 544, final demodulation circuitry 546, and BLW prediction circuitry 508) are similar to those of computing devices 300, 400, and so, for the sake of brevity, their structure, function, and operation are not repeated herein, except insofar as may be necessary to explain how the computing devices differ.

ADC 510 may receive a corrected waveform 539 from adder 538, which may operate to compensate for a baseline wander error in incoming waveform 501 received from a communication channel (e.g., by subtracting an analog BLW error 505 provided by DAC 504 as described below). ADC 510 may operate to sample the corrected waveform 539 and generate a digital signal 511, which may be provided to initial equalizer 512.

Initial equalizer 512 may receive digital signal 511 and operate to equalize the digital signal 511 and generate an equalized signal 513 therefrom. Initial equalizer 512 may provide equalized signal 513 to initial demodulation circuitry 514 and error calculator 516, as well as to adder 532 along a main data path.

Initial demodulation circuitry 514 may receive equalized signal 513 and operate to demodulate equalized signal 513 and generate an estimated transmitted symbol stream, or demodulated signal 515, therefrom, which may contain a series of preliminary symbol determinations corresponding to the equalized sample values in equalized signal 513. In some embodiments, for example, initial demodulation circuitry 514 may take the form of a slicer that may compare the value of equalized signal 513 to a set of threshold values (or slicer levels) to make a symbol determination. In some embodiments, slicer levels 517 may be provided as an input to initial demodulation circuitry 514 (e.g., by demodulation circuitry adapter 518, which may adapt the slicer levels 517 as described below). The demodulated signal 515 containing the preliminary symbol determinations may be provided to error calculator 516 and demodulation circuitry adapter 518, as well as BLW prediction circuitry 508 and temporary correction circuitry 506.

Error calculator 516 may receive equalized signal 513, demodulated signal 515, and a set of amplitude levels 519 (e.g., from demodulation circuitry adapter 518, which may adapt the amplitude levels 519 as described below) and may operate to determine an error signal between equalized signal 513 and a corresponding amplitude level and generate an error signal therefrom. In some embodiments, for example, error calculator 516 may compare a value of equalized signal 513 to a corresponding level in the set of amplitude levels 519 to determine an error (e.g., an amount of difference, a sign of the difference, or a ratio or percentage difference). The error determined by error calculator 516 may be provided as an error signal to demodulation circuitry adapter 518.

Demodulation circuitry adapter 518 may receive the error signal and demodulated signal 515 from error calculator 516 and may operate to adapt slicer levels 517 (yth) and amplitude levels 519 (eth). In some embodiments, for example, demodulation circuitry adapter 518 may include an integrator that may accumulate an error for each amplitude level in the modulation scheme over a number of samples (e.g., across 128 samples). In some embodiments, for instance, demodulation circuitry adapter 518 may include a gradient multiply-accumulator (or GMAC) that may accumulate the error signal received from error calculator 516 based on demodulated signal 515. In some cases, the GMAC may adjust the accumulated errors based on a probability of each amplitude level. Demodulation circuitry adapter 518 may use the adapted amplitude levels 519 to adapt slicer levels 517. In some embodiments, for example, demodulation circuitry adapter 518 may bisect adapted amplitude levels 519 to obtain adapted slicer levels 517. The adapted slicer levels 517 and amplitude levels 519 may be fed back to initial demodulation circuitry 514 and error calculator 516, respectively, and passed along to other components on the main data path (e.g., to final equalizer 544, and/or final demodulation circuitry 546). As discussed below, slicer levels 517 and amplitude levels 519 may be adjusted (e.g., at adders 534 and 536, respectively) based on BLW error 509 determined by BLW prediction circuitry 508.

BLW prediction circuitry 508 may receive demodulated signal 515 and may operate to calculate (or predict) an amount of BLW error expected in incoming waveform 501 (and digital signals derived therefrom, e.g., digital and equalized signals 511, 513), or BLW error 509. In some embodiments, for example, the preliminary symbol determinations of demodulated signal 515 may be used to excite a predictive low-pass filter (or predictive filter) that models an error transfer function of the communication channel on which the incoming waveform 501 is carried (e.g., the error transfer function of Eq. 6). In some cases, the frequency and gain characteristics of the communication channel (and high-pass filter element(s) therein) may be known, which may allow the frequency $f_{blw}$ and gain $G_{blw}$ parameters of the predictive filter to be set precisely. In others, the channel characteristics may not be known and/or only be approximated, and the frequency $f_{blw}$ and gain $G_{blw}$ parameters of the predictive filter may be approximated and tuned for optimal operation (e.g., through a calibration process). In some embodiments, the predictive filter may be realized as an IIR filter (e.g., as illustrated in FIG. 6 and described with respect thereto).

The predicted BLW error 509 generated by BLW prediction circuitry 508 may be provided to DAC 504, which may operate to convert BLW error 509 into analog form to generate analog BLW error 505. DAC 504, in turn, may provide analog BLW error 505 to adder 538. Adder 538 may receive the analog BLW error 505 and an incoming waveform 501, for example, from a communication channel, and may operate to adjust the incoming waveform 501 to compensate for BLW therein (e.g., by subtracting analog BLW error 505 from incoming waveform 501).

Temporary correction circuitry 506 may receive demodulated signal 515 and may operate to calculate (or predict) an initial BLW error 507, which may be used to temporarily adjust (or correct) equalized signal 513 in the digital domain. That is, the adjustment may compensate for BLW error in the equalized signal 513 until correction in the analog domain can be affected (e.g., through adjustment of incoming waveform 501 based on predicted analog BLW error 505). In this way, double correction (i.e., on account of the delay in realizing compensation in the analog domain) may be avoided. In some embodiments, for example, temporary correction circuitry 506 may include a finite impulse response (FIR) filter having an impulse response as the difference between the desired correction and the delayed analogue compensation. In some embodiments, for instance, temporary correction circuitry 506 may include an FIR filter that computes a running sum over a segment of symbols (e.g., $N_{seg}$=64) in demodulation signal 515. In some embodiments, the length of the running sum may be equal to the delay in realizing analog compensation (e.g., the delay in analog BLW error 505 reaching adder 538, as discussed below). In some embodiments, temporary correction circuitry 506 may also operate to scale the running sum such that they fall within a desired range (e.g., −1024 to 1023).

The initial BLW error 507 generated by temporary correction circuitry 506 may be provided to adder 532 along the main data path. Adder 532 may also receive equalized signal 513 from initial equalizer 512 and may operate to correct (or adjust) the equalized signal 513 to generate corrected signal 533 (e.g., by subtracting initial BLW error 507 from equalized signal 513). Adder 532 may pass the corrected signal 533 along the main data where it may undergo further processing (e.g., further equalization) before passing through a final demodulator to obtain a final symbol determination.

Final equalizer 544 may receive corrected signal 533 and operate to equalize corrected signal 533 and generate a further equalized signal 545 therefrom. In some embodiments, for example, final equalizer 544 may include a DFFE, but other equalizers may be included in addition to, or in place thereof, those mentioned depending on the embodiment and its application. Final equalizer 544 may provide further equalized signal 545 to final demodulation circuitry 546.

Final demodulation circuitry 546 may receive further equalized signal 545 and operate to demodulate further equalized signal 545 and generate a final demodulated signal 551 therefrom containing a series of final symbol determinations. In some embodiments, for example, final demodulation circuitry 546 may employ simple symbol by symbol detection, a full Viterby decoder, or approximate Viterby decoding to determine a corresponding symbol for each value in further equalized signal 545. Final demodulation circuitry 546 may output final demodulated signal 551, for example, to a decoder that may decode the final symbol determination (e.g., to obtain the transmitted data encoded thereby).

It will be appreciated that in some embodiments computing device 500 may be included or incorporated into a larger system or device, including for example, a serializer/deserializer (SerDes) device, a receiver, a transceiver, a network communication system, and/or other system or device in which high-speed data transmissions may be received. Furthermore, while FIG. 5 illustrates a particular embodiment of computing device 500, it will be appreciated that other embodiments and/or variations thereof may fall within the scope of the present disclosure. In some embodiments, for example, the BLW error 509 generated by BLW prediction circuitry 508 or the initial BLW error 507 generated by initial correction circuitry 506 may be used to correct (or adjust) slicer levels 517 and amplitude levels 519 provided to initial demodulation circuitry 514, for example, by including adders 534 and 536 (e.g., similar to the computing device 400 of FIG. 4). In some embodiments, computing device 500 may also include additional correction circuitry to compensate for drift in a received waveform generally in the analog domain, as described above with respect to computing device 300.

FIG. 6 is a block diagram of a predictive filter 608 for predicting baseline wander, in accordance with at least some embodiments. Predictive filter 608 may model the error transfer function of a communication channel and may be excited with a preliminary symbol determination to calculate (or predict) an amount of BLW error 609 that transmission of the symbol(s) would have introduced in a received waveform (and digital signals derived therefrom). Predictive filter 608, for example, may be used to model an error transfer function of a communication channel with one or more high-pass filter elements therein (e.g., one or more AC-couplings, DC-blocks), having an effective frequency $f_{ch}$ and channel gain $G_{ch}$. In some embodiments, for example, predictive filter 608 may be a low-pass filter having a pole frequency $f_{blw}$ and gain $G_{blw}$.

Predictive filter 608 may include a base filter 650 and a scaling unit 670, which may operate to scale the output of base filter 650 to achieve the desired gain. Base filter 650 may take the form of a low-pass IIR filter, with a pole frequency of $f_{blw}$ (set by parameters $k_1$ and $k_2$ as discussed below) and a constant DC gain. In some embodiments, for example, base filter 650 may implement the following recursion:

$$y_n = G_{DC}\alpha\, x_n + y_{n-1} - \alpha y_{n-1} \qquad \text{Eq. 12}$$

where $\alpha$ is a feedback coefficient, and $G_{DC}$ is a DC gain of the filter. Alternatively, a direct form II formulation of Eq. 12 may be parameterized by vectors a and b, where a=[1,−(1−$\alpha$)] and b=$G_{DC}\,\alpha$). In some embodiments, for instance, the feedback coefficient, $\alpha$, and the input scaling, b, of base filter 650 may be:

$$\alpha = 2^{-8}\left(2^{-k_1} + 2^{-k_2}\right) \qquad \text{Eq. 13}$$

$$b = 2^{+4}\left(2^{-k_1} + 2^{-k_2}\right) \qquad \text{Eq. 14}$$

such that:

$$G_{DC} = \frac{b}{\alpha} = 2^{+12} \qquad \text{Eq. 15}$$

where parameters $k_1$ and $k_2$ are used to set the pole frequency $f_{blw}$ of base filter 650.

In some cases, the pole frequency $f_{blw}$ of base filter 650 may depend on a clock interval $T_{clk}$ (e.g., of the device in which the base filter 650 is implemented) and a filter time constant t. The pole frequency $f_{blw}$, for example, may be determined according to the following relationships:

$$\alpha = \frac{T_{clk}}{\tau} \qquad \text{Eq. 16}$$

$$f_{blw} = \frac{1}{2\pi\,\tau} = \frac{1}{T_{clk}} \cdot \frac{\alpha}{2\pi} = \frac{f_{sym}}{N_{seg}} \cdot \frac{\alpha}{2\pi} \qquad \text{Eq. 17}$$

where $f_{sym}$ is a symbol rate, and $N_{seg}$ is a multiplexing ratio. Illustratively, for a symbol rate $f_{sym}$ of 106.25 GHz and a multiplexing ratio $N_{seg}$ of 64, the pole frequencies (in kHz) for different values of $k_1$ and $k_2$ may be as follows:

| | $k_1$ | | | | |
|---|---|---|---|---|---|
| $k_2$ | 0 | 1 | 2 | 3 | 4 |
| 0 | 2064 | 1548 | 1290 | 1161 | 1097 |
| 1 | 1548 | 1032 | 774 | 645 | 581 |
| 2 | 1290 | 774 | 516 | 387 | 323 |
| 3 | 1161 | 645 | 387 | 258 | 194 |
| 4 | 1097 | 581 | 323 | 194 | 129 |

An illustrative example of base filter 650 is shown in FIG. 6. As illustrated, a demodulated signal ŷ[n] may be provided to base filter 650 at summation block 651, which may compute a sum of the demodulated signal over a segment of symbols (e.g., $N_{seg}$=64 symbols). The summation block 651, for example, may compute the sum of the demodulated signal over a clock cycle, such that one value per clock cycle is provided to the remaining filter blocks.

The output of summation block 651 may be provided to input gain block 652, which may apply an input gain to the provided value. In some embodiments, for example, input gain block 652 may perform a left-shift operation to shift the binary representation of the value by/bits. By way of example, input gain 652 may perform a 4-bit left-shift operation that may apply a gain of 16. The output of input gain block 652 may be provided to adder 653, which may subtract a feedback value received from feedback gain block 660 (discussed further below) therefrom.

The output of adder 653 may then be provided to $k_1$ gain block 654 and $k_2$ gain block 655 which may apply a gain corresponding to parameters $k_1$ and $k_2$ (i.e., corresponding to a desired pole frequency of the filter). In some embodiments, for example, $k_1$ gain block 654 and $k_2$ gain block 655 may perform a right-shift operation to shift the binary representation of the provided value by $k_1$ and $k_2$ bits, respectively. By way of example, filter parameters $k_1$ and $k_2$ may take values of between 0 to 4, which may result in a gain of between 1 and 1. The output of $k_1$ gain block 654 and $k_2$ gain block 655 may provided to adder 656, which may add the two values together. The output of adder 656, in turn, may be provided to adder 657, which may subtract a feedback value received from filter state adjustment block 659 (discussed further below) therefrom.

The output of adder 657 may be provided to saturation block 658, which may operate to limit a value provided by adder 657 to a particular saturation limit. In some embodiments, for example, saturation block 658 may limit the value provided by the output of adder 657 to a certain size (e.g., to a certain number of bits). The output of saturation block 658 may then be provided to filter state block 659, which may operate to adjust a state of the filter. Filter state block 659, for example, may reset a state of the filter (e.g., by providing an output value of 0) or retime the filter (e.g., to align with a base clock frequency).

The output of filter state block 659 may be provided as feedback to adder 657 (as noted above) and to adder 653 after applying an attenuation gain at feedback gain block 660. In some embodiments, for example, feedback gain block 660 may perform a right-shift operation to apply a desired attenuation factor. Feedback gain block 660, for instance, may perform an 8-bit right-shift operation to apply an attenuation factor of 1/256.

The output of filter state block 659 may also serve as the output of base filter 650, which may be passed to scaling unit 670. Scaling unit 670 may operate to scale the output of base filter 650 to achieve the desired gain $G_{blw}$.

Figure 7:
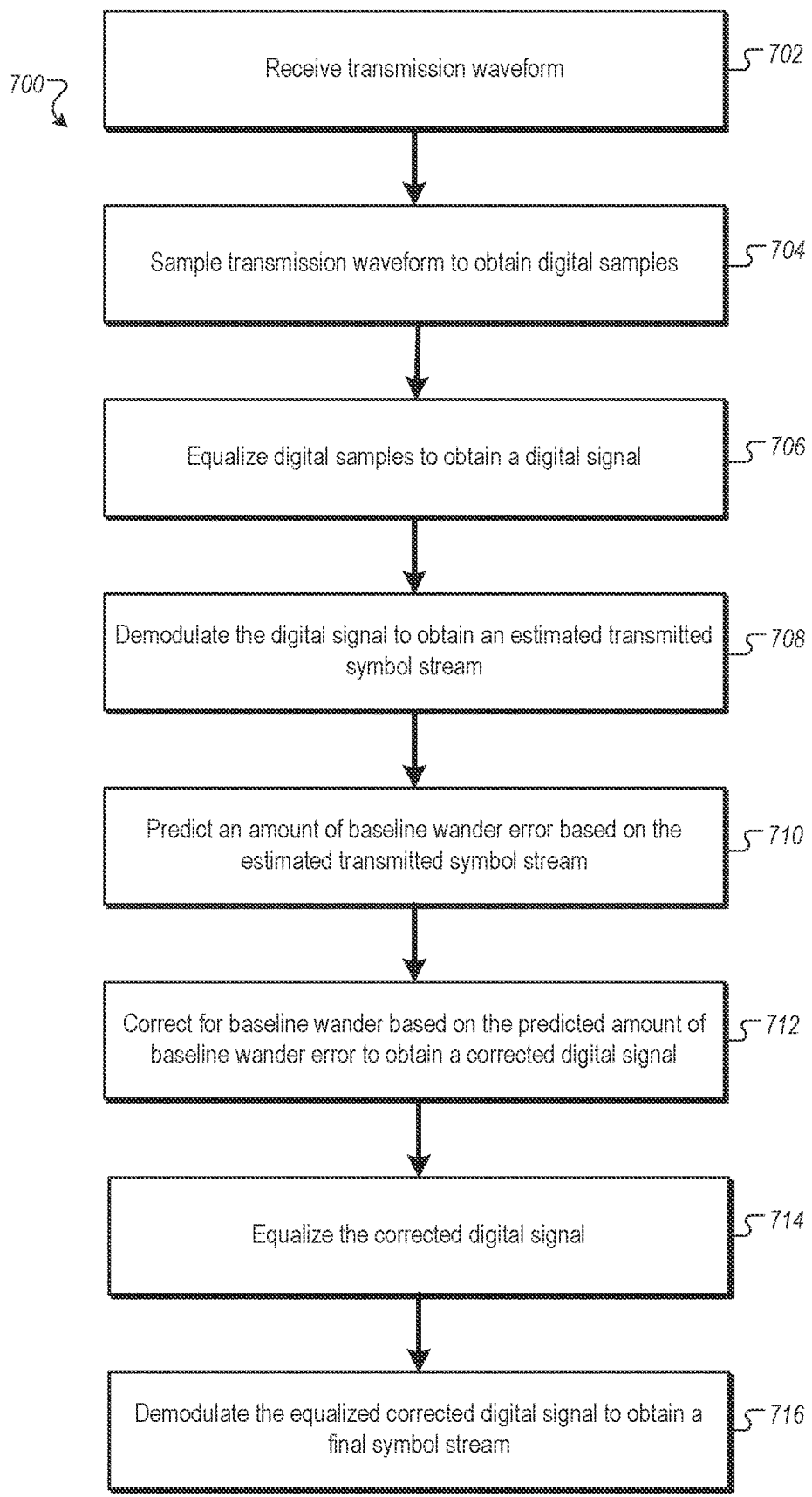
FIG. 7 is a flow diagram of an example method for performing predictive baseline wander correction.

FIG. 7 is a flow diagram of an example method for performing predictive baseline wander correction. The method 700 can be performed by processing logic comprising hardware, software, firmware, or any combination thereof. In at least one embodiment, the method 700 is performed by any one of device 110 or device 120 of FIG. 1. In at least one embodiment, the method 700 is performed by receiver 220 of FIG. 2. In at least one embodiment, the method 700 is performed by any one of computing device 300, 400, or 500 of FIGS. 3-5.

Referring to FIG. 7, at block 702, the processing logic may receive a transmission waveform over a communication channel (e.g., an electronic and/or optical channel). At block 704, the processing logic may sample the transmission waveform to obtain one or more digital samples. The received waveform, for example, may be an analog waveform (e.g., a voltage waveform captured by a photodetector coupled to an optical channel) that may be sampled (e.g., by measuring an amplitude of the received waveform) at periodic intervals to generate a series of one or more digital samples.

At block 706, the processing logic may equalize the digital samples to obtain a digital signal. In some embodiments, for example, the digital samples may be equalized to improve a signal-to-noise ratio (SNR) and/or to scale the sample values to fall within a desired range. In some embodiments, for instance, the digital samples may be passed through a linear FFE, which may take the form of an FIR filter, a CTLE, and/or another suitable equalizer.

At block 708, the processing logic may demodulate the digital signal to obtain an estimated transmitted symbol stream containing preliminary symbol determination(s). For example, for each value in the digital signal, a preliminary determination may be made as to a corresponding symbol encoded thereby. In some embodiments, for instance, the digital signal may carry information encoded using an amplitude modulation scheme (e.g., as a PAM modulation scheme), and based on a value of the digital signal, a determination may be made as to a corresponding symbol in the amplitude modulation scheme (e.g., in a corresponding PAM alphabet). In some embodiments, for example, the processing logic may demodulate the digital signal according to different demodulation levels. In some embodiments, for example, the digital signal may be passed through a slicer that may compare the value of the digital signal to a set of threshold values (or slicer levels)—which may mark the boundary between amplitude ranges for each symbol in the symbol alphabet—to make a symbol determination. In some embodiments, an error may be determined between the digital signal and a corresponding amplitude level in a set of amplitude levels of the modulation scheme and an error signal may be generated. In some embodiments, the slicer levels and amplitude levels may be adapted based on the error signal. In some embodiments, for example, an integrator may accumulate an error for each amplitude level in the modulation scheme over a number of samples (e.g., across 128 samples). The output of the integrator may then be used to adapt the amplitude levels and, in turn, the slicer levels.

At block 710, the processing logic may predict an amount of baseline wander error in the received waveform (and any digital samples and signals derived therefrom) based on the estimated transmitted symbol stream. In some embodiments, for example, the preliminary symbol determination(s) (i.e., determined at block 708) may be used to excite a low-pass filter that models an error transfer function of the communication channel on which the received waveform was carried. In some embodiments, the low-pass filter (or predictive filter) may be realized as an IIR filter.

At block 712, the processing logic may correct for baseline wander based on the predicted amount of baseline wander error to obtain a corrected digital signal. In some embodiments, for example, the processing logic may adjust the digital signal based on the estimated amount of baseline wander. In some embodiments, the processing logic may adjust the demodulation levels used to demodulate the digital signal based on the estimated amount of baseline wander. In some embodiments, the processing logic may adjust the received transmission waveform based on the amount of baseline wander.

At block 714, the processing logic may further equalize the corrected digital signal. In some embodiments, for example, the corrected digital signal may be passed through a DFFE and/or another suitable equalizer. At block 716, the processing logic may demodulate the equalized corrected digital signal to make a final symbol determination and general a final symbol stream. In some embodiments, for example, simple symbol by symbol detection, a full Viterby decoder, or approximate Viterby decoding may be used to determine a corresponding symbol for each value in the equalized corrected signal. In some embodiments, the final symbol stream may be passed to a decoder to decode the final symbol determinations, for example, to obtain the transmitted data encoded thereby.

Other variations are within the spirit of the present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range, unless otherwise indicated herein, and each separate value is incorporated into the specification as if it were individually recited herein. In at least one embodiment, the use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. In at least one embodiment, a set of non-transitory computer-readable storage media comprises multiple non-transitory computer-readable storage media and one or more individual non-transitory storage media of multiple non-transitory computer-readable storage media lack all of the code, while multiple non-transitory computer-readable storage media collectively store all of the code. In at least one embodiment, executable instructions are executed such that different instructions are executed by different processors.

Accordingly, in at least one embodiment, computer systems are configured to implement one or more services that singly or collectively perform operations of processes described herein, and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, the terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to actions and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. As a non-limiting example, a "processor" may be a network device. A "computing platform" may comprise one or more processors. As used herein, "software" processes may include, for example, software and/or hardware entities that perform work over time, such as tasks, threads, and intelligent agents. Also, each process may refer to multiple processes for continuously or intermittently carrying out instructions in sequence or parallel. In at least one embodiment, the terms "system" and "method" are used herein interchangeably insofar as the system may embody one or more methods, and methods may be considered a system.

In the present document, references may be made to obtaining, acquiring, receiving, or inputting analog or digital data into a subsystem, computer system, or computer-implemented machine. In at least one embodiment, the process of obtaining, acquiring, receiving, or inputting analog and digital data can be accomplished in a variety of ways, such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface, or an inter-process communication mechanism.

Although descriptions herein set forth example embodiments of described techniques, other architectures may be used to implement described functionality, and are intended to be within the scope of this disclosure. Furthermore, although specific distributions of responsibilities may be defined above for purposes of description, various functions and responsibilities might be distributed and divided in different ways, depending on circumstances.

Furthermore, although the subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method comprising:
   generating an equalized signal from one or more digital samples;
   demodulating the equalized signal to obtain an estimated transmitted symbol stream;
   mapping, using an error transfer function of a communication channel, the estimated transmitted symbol stream to a baseline wander error representing an estimated amount of baseline wander in the equalized signal; and correcting the equalized signal by subtracting the baseline wander error from the equalized signal.

2. The method of claim 1, wherein mapping the estimated transmitted symbol stream to the baseline wander error comprises:

exciting a low-pass filter with the estimated transmitted symbol stream.

3. The method of claim 1, wherein the estimated amount of baseline wander is a predictable offset in the equalized signal.

4. The method of claim 2, wherein the low-pass filter models the error transfer function of the communication channel.

5. The method of claim 2, wherein a pole of the low-pass filter is an effective frequency of the communication channel, and a gain of the low-pass filter is a gain of the communication channel.

6. The method of claim 3, wherein generating the equalized signal from the one or more digital samples comprises:

sampling a transmission waveform received over the communication channel to obtain the one or more digital samples; and equalizing the digital samples to generate the equalized signal.

7. The method of claim 3, wherein the predictable offset in the equalized signal results from one or more DC-blocks, AC-couplings, or control loops on the communication channel.

8. The method of claim 2, wherein the low-pass filter is an infinite impulse response (IIR) filter.

9. The method of claim 1, wherein the baseline wander error is an instantaneous error.

10. A device comprising:

an equalizer to generate an equalized signal from one or more digital samples;

demodulation circuitry, coupled to the equalizer, to demodulate the equalized signal to obtain an estimated transmitted symbol stream;

baseline wander prediction circuitry comprising a predictive element modeling an error transfer function, coupled to the demodulation circuitry, to map the estimated transmitted symbol stream to a baseline wander error representing an estimated amount of baseline wander in the equalized signal; and baseline wander correction circuitry to correct the equalized signal by subtracting the baseline wander error from the equalized signal.

11. The device of claim 10, wherein the estimated amount of baseline wander is a predictable offset in the equalized signal.

12. The device of claim 11 further comprising:

an analog-to-digital converter to sample a transmission waveform received over a communication channel to obtain the one or more digital samples; and the equalizer, coupled to the analog-to-digital converter, to equalize the one or more digital samples to generate the equalized signal.

13. The device of claim 10, wherein the predictive element is a low-pass filter that models the error transfer function of a communication channel.

14. The device of claim 10, wherein the baseline wander error is an instantaneous error.

* * * * *